US010578871B2

(12) United States Patent
Abe et al.

(10) Patent No.: US 10,578,871 B2
(45) Date of Patent: Mar. 3, 2020

(54) RETINAL SCAN DISPLAY DEVICE FOR CORRECTING DISTORTION OF AND INVERTING IMAGE

(71) Applicants: Misato Abe, Tokyo (JP); Kimiyuki Ohba, Tokyo (JP); Mitsuru Sugawara, Kanagawa (JP); Makoto Suzuki, Kanagawa (JP)

(72) Inventors: Misato Abe, Tokyo (JP); Kimiyuki Ohba, Tokyo (JP); Mitsuru Sugawara, Kanagawa (JP); Makoto Suzuki, Kanagawa (JP)

(73) Assignees: MITSUMI ELECTRIC CO., LTD., Tokyo (JP); QD Laser, Inc., Kanagawa (JP)

( * ) Notice: Subject to any disclaimer, the term of this patent is extended or adjusted under 35 U.S.C. 154(b) by 52 days.

(21) Appl. No.: 15/752,768

(22) PCT Filed: Sep. 26, 2016

(86) PCT No.: PCT/JP2016/078246
§ 371 (c)(1),
(2) Date: Feb. 14, 2018

(87) PCT Pub. No.: WO2017/061290
PCT Pub. Date: Apr. 13, 2017

(65) Prior Publication Data
US 2018/0252920 A1    Sep. 6, 2018

(30) Foreign Application Priority Data

Oct. 5, 2015    (JP) .................................. 2015-198033

(51) Int. Cl.
*G02B 27/01*    (2006.01)
*G02B 27/02*    (2006.01)
(Continued)

(52) U.S. Cl.
CPC ......... *G02B 27/0172* (2013.01); *G02B 26/10* (2013.01); *G02B 26/105* (2013.01);
(Continued)

(58) Field of Classification Search
CPC .... G02B 27/0172; G02B 27/02; G02B 26/10; G02B 2027/0178; G09G 3/20; G09G 3/02;
(Continued)

(56) References Cited

U.S. PATENT DOCUMENTS 5,003,300 A * 3/1991 Wells ..................... G02B 13/16
340/980
2010/0026970 A1   2/2010 Tanaka
(Continued)

FOREIGN PATENT DOCUMENTS

JP    2001-330794    11/2001
JP    2011-66549    3/2011
(Continued)

OTHER PUBLICATIONS

International Search Report for PCT/JP2016/078246 dated Nov. 29, 2016.
(Continued)

*Primary Examiner* — Ryan A Lubit
(74) *Attorney, Agent, or Firm* — IPUSA, PLLC

(57) ABSTRACT

The present display device is a retinal scan display device including: a projection optical system configured to project an image to a retina of an eye; a distortion correcting unit configured to correct a distortion of the image; an image inverting unit configured to invert the image; and a storage unit configured to store correction data for correcting the distortion of the image when the image is projected to a left eye and correction data for correcting the distortion of the image when the image is projected to a right eye, wherein,
(Continued)

based on a switching signal that represents that a side at which the projection optical system is arranged has been switched from one eye side to the other eye side, the distortion correcting unit performs distortion correction, by switching from correction data corresponding to one eye to correction data corresponding to the other eye, and the image inverting unit performs image inversion.

5 Claims, 11 Drawing Sheets

(51) Int. Cl.
| | | |
|---|---|---|
| *G02B 26/10* | (2006.01) | |
| *G09G 3/02* | (2006.01) | |
| *G09G 3/20* | (2006.01) | |
| *H04N 5/64* | (2006.01) | |
| *H04N 9/31* | (2006.01) | |
| *G09G 5/36* | (2006.01) | |
| *G09G 5/28* | (2006.01) | |
| *G06K 9/00* | (2006.01) | |
| *G06T 5/00* | (2006.01) | |

(52) U.S. Cl.
CPC ......... *G02B 27/02* (2013.01); *G06K 9/00604* (2013.01); *G06T 5/002* (2013.01); *G09G 3/02* (2013.01); *G09G 3/025* (2013.01); *G09G 3/20* (2013.01); *G09G 5/28* (2013.01); *G09G 5/36* (2013.01); *H04N 5/64* (2013.01); *H04N 9/3135* (2013.01); *G02B 2027/0178* (2013.01); *G09G 2340/0492* (2013.01)

(58) Field of Classification Search
CPC .......... G09G 5/36; H04N 5/64; H04N 9/3135; G06T 5/002
See application file for complete search history.

(56) References Cited

U.S. PATENT DOCUMENTS

| | | |
|---|---|---|
| 2010/0103077 A1 | 4/2010 | Sugiyama et al. |
| 2011/0122101 A1 | 5/2011 | Kurozuka |
| 2016/0034032 A1* | 2/2016 | Jeong ..................... G06F 3/013 |
| | | 345/156 |
| 2016/0103324 A1 | 4/2016 | Arakawa et al. |
| 2017/0039687 A1* | 2/2017 | Hirota ..................... G06T 5/003 |
| 2018/0239487 A1* | 8/2018 | Tsukahara ............. G06F 3/0416 |

FOREIGN PATENT DOCUMENTS

| | | |
|---|---|---|
| JP | 2012-74811 | 4/2012 |
| JP | 2014-21708 | 2/2014 |
| JP | 2015-111231 | 6/2015 |
| WO | 2009/066465 | 5/2009 |
| WO | 2010/044205 | 4/2010 |
| WO | 2014/192479 | 12/2014 |

OTHER PUBLICATIONS

Extended European search report for European Patent Application No. 16853444.4 dated Apr. 17, 2019.
Japanese Office Action for 2015-198033 dated Oct. 23, 2019.

\* cited by examiner (a)

(c)

(b)

(d)

RETINAL SCAN DISPLAY DEVICE FOR CORRECTING DISTORTION OF AND INVERTING IMAGE

TECHNICAL FIELD

The present invention relates to a display device.

BACKGROUND ART

Conventionally, as a display device that is worn on a head of a user, a retinal scan display device that directly projects light onto a retina of the user to form an image to cause the user to visually recognize the image is known. For example, a retinal scan display device that includes a control device and a projecting device such that the control device reads identification information from the projecting device, identifies the projecting device based on the read identification information, and specifies an optimum control method is disclosed (for example, see Patent Document 1).

PRIOR ART DOCUMENTS

Patent Documents

Patent Document 1: Japanese Unexamined Patent Application Publication No. 2012-74811

SUMMARY OF THE INVENTION

Problem to be Solved by the Invention

However, in the conventional display device, a projection optical system is mounted only on one eye side. However, there are users whose dominant eyes are a right eye, and there are users whose dominant eyes are a left eye. Thus, it is difficult for a display device, in which a projection optical system is mounted only on one eye side, to be used by various users.

In view of the above, the present invention has an object to provide a display device that is wearable in accordance with a dominant eye of a user.

Means for Solving the Problem

The present display device (1) is a retinal scan display device including: a projection optical system (15) configured to project an image to a retina of an eye; a distortion correcting unit (221) configured to correct a distortion of the image; an image inverting unit (232) configured to invert the image; and a storage unit (222) configured to store correction data for correcting the distortion of the image when the image is projected to a left eye and correction data for correcting the distortion of the image when the image is projected to a right eye, wherein, based on a switching signal that represents that a side at which the projection optical system (15) is arranged has been switched from one eye side to the other eye side, the distortion correcting unit (221) is configured to perform distortion correction, by switching from correction data corresponding to one eye to correction data corresponding to the other eye, and the image inverting unit (232) is configured to perform image inversion.

Note that the reference numerals in the above-described parentheses are attached to facilitate understanding; these are merely examples, and the depicted embodiments are not limiting.

Advantageous Effect of the Invention

According to a disclosed technique, it is possible to provide a display device that is wearable in accordance with a dominant eye of a user.

EMBODIMENTS FOR IMPLEMENTING THE INVENTION

Figure 1:
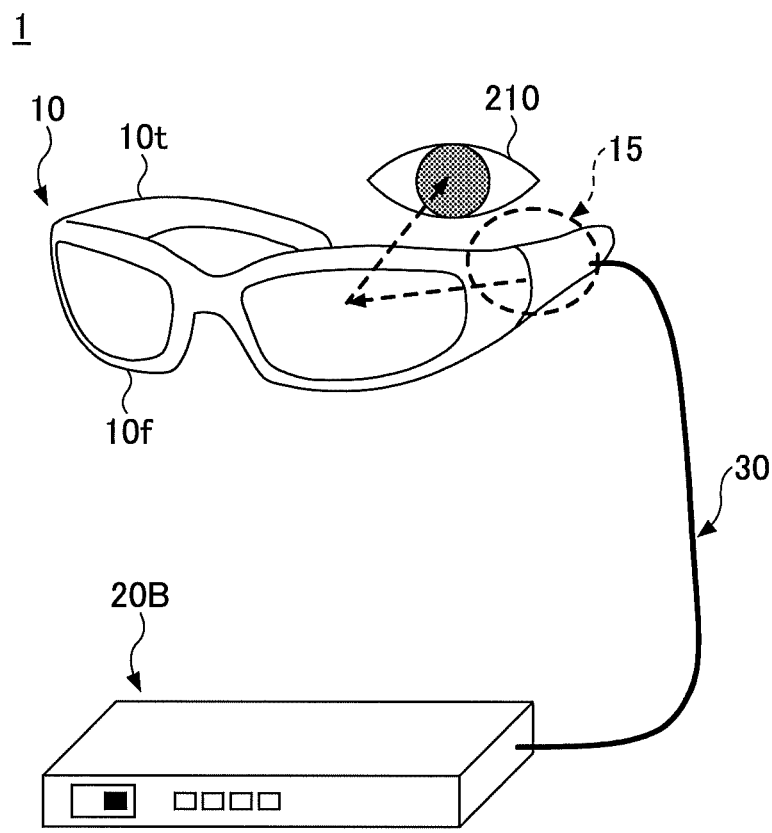
FIG. 1 is a perspective view illustrating an example of an appearance of a display device according to the present embodiment.

In the following, an embodiment for implementing the present invention will be described with reference to the drawings. In the drawings, the same reference numerals may be attached to the same components, respectively, and duplicate descriptions may be omitted.

[Outline of Display Device]

Figure 2:
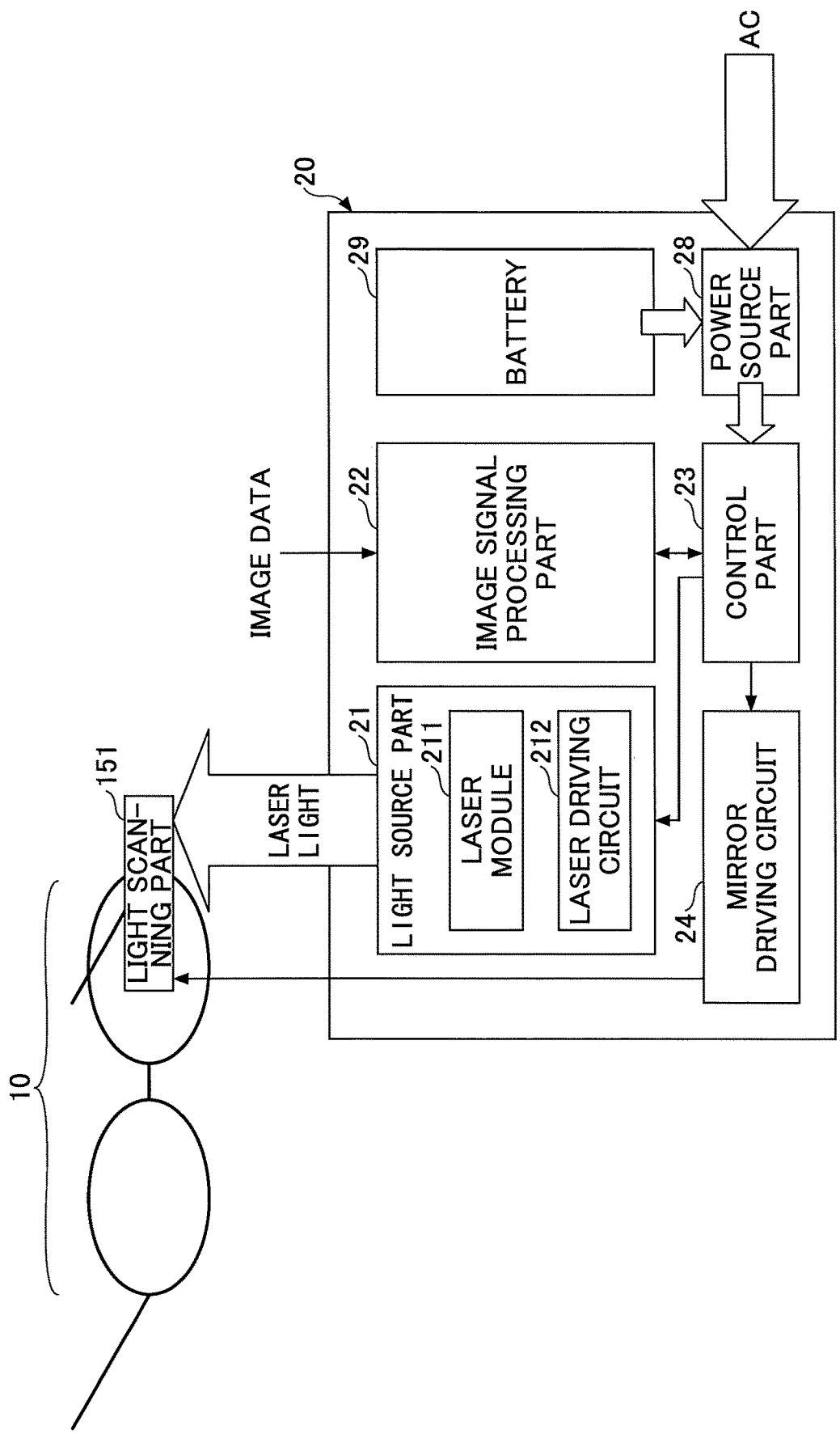
FIG. 2 is an example of a block diagram schematically illustrating the display device according to the present embodiment.
Figure 3:
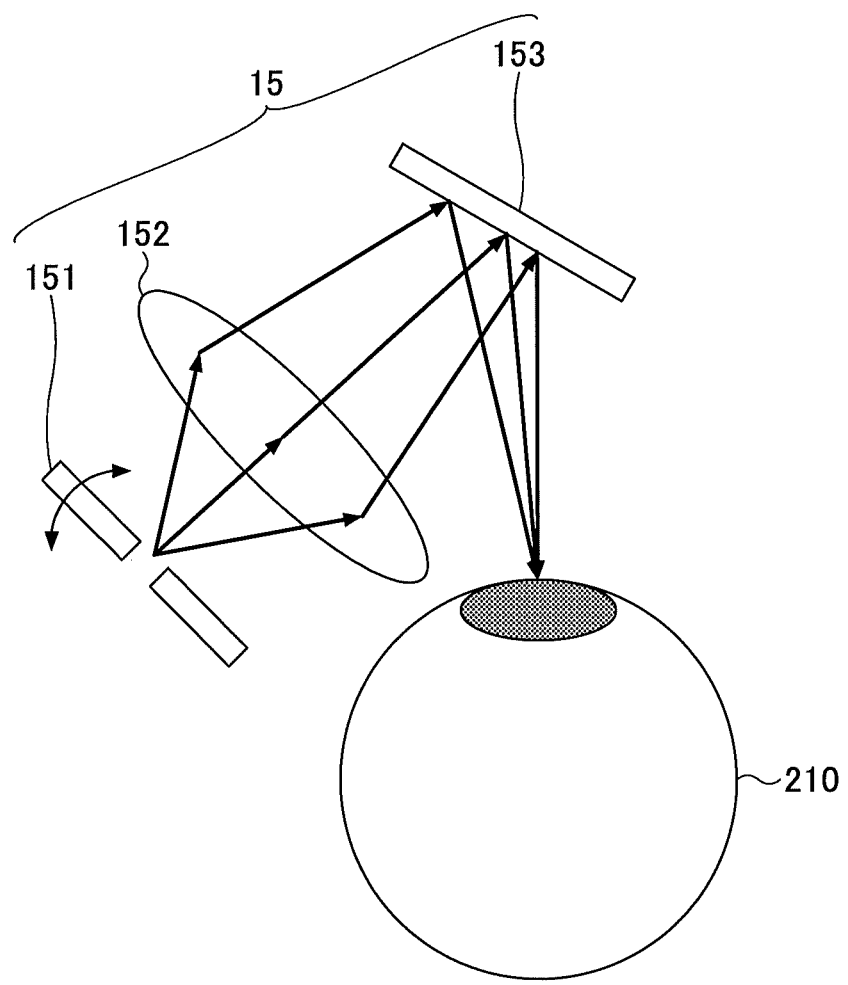
FIG. 3 is a diagram illustrating an example of a projection optical system of the display device according to the present embodiment.

FIG. 1 is a perspective view illustrating an example of an appearance of a display device according to the present embodiment. FIG. 2 is an example of a block diagram schematically illustrating the display device according to the present embodiment. FIG. 3 is a diagram illustrating an example of a projection optical system of the display device according to the present embodiment.

The display device 1 that are illustrated in FIG. 1 to FIG. 3 is a retinal scan head-mounted display that directly projects an image to a retina. Because the display device 1 is of a retinal scan type, an image (virtual image) can be viewed regardless of vision. Hence, for example, the display device 1 can be used as a device for supporting a person whose eyesight is poor.

The display device 1 includes, as main components, a wearable part 10 that is worn on a head of a wearer (user) and a control box 20B that controls the wearable part 10. The control box 20B is, for example, a rectangular parallelepiped casing, and can be provided with various switches, a display part, and the like as needed. In the control box 20B, a circuit part 20 that operates the wearable part 10 is built. The wearable part 10 and the circuit part 20 in the control box 20B are coupled through a cable 30 that includes an optical fiber or an electric wire.

According to the present embodiment, the wearable part 10 has a glasses shape, for example, and is constituted by a front 10f and a temple 10t provided as a pair on each of the left and right substantially symmetrically. Each front 10f holds a lens (whose lens power may be zero).

On one of the left and right temples 10t (on the left eye side in FIG. 1), a projection optical system 15 that includes an optical scanning part 151, a lens 152, and a half mirror 153 that are illustrated in FIG. 3 is mounted. That is, in the display device 1, the projection optical system 15 is mounted only on one eye side. The projection optical system 15 can be arranged at both a right eye side and a left eye side, and includes a function to project an image to the retina of an eye at an arranged side.

The circuit part 20 includes a light source part 21, an image signal processing part 22, a control part 23, a mirror driving circuit 24, a power source part 28, and a battery 29.

To the light source part 21, the image signal processing part 22, the control part 23, and the mirror driving circuit 24, power of a predetermined voltage is supplied from the power source part 28. The power source part 28 includes a circuit that converts an AC voltage into a predetermined DC voltage, a circuit that selects a voltage supplied from the battery 29 and the DC voltage converted from the AC voltage, and the like. The battery 29 is a lithium ion battery, for example. Note that in FIG. 2, power flows as indicated by the thick arrows and signals flows as indicated by the thin arrows.

The light source part 21 includes a laser module 211 and a laser driving circuit 212. The laser module 211 includes lasers of three colors, which are red (for example, a wavelength of 640 nm), green (for example, a wavelength of 530 nm), and blue (for example, a wavelength of 445 nm) whose emission light amounts vary in accordance with electric current values, a light amount detecting sensor that monitors the emission light amounts of the respective lasers, and the like.

The image signal processing part 22 performs predetermined signal processing on digital image data supplied from the outside of the circuit part 20, and transfers the data to the control part 23. The digital image data is, for example, data in conformity with HDMI (High-Definition Multimedia Interface). For example, the control part 23 supplies, to the laser driving circuit 212 of the light source part 21, the image data from the image signal processing part 22. Note that the image data may be data for an image prepared in advance or may be data for an image from a compact camera attached to the wearable part 10, for example.

The laser driving circuit 212 supplies predetermined electric currents to the respective lasers based on the image data from the control part 23. Thus, the respective lasers emit red, green, and blue light modulated according to the image data, and a color image can be formed by combining these.

At this time, the control part 23 monitors the output of the light amount detection sensor provided in the laser module 211 and controls the light amounts of the respective lasers of the laser module 211. That is, an electric current of each laser is controlled by the control unit 23 so as to have a predetermined output (light amount). Light of the wavelength emitted from each laser is combined by a dichroic mirror or the like, is diminished to a predetermined light amount by a dimming filter or the like as needed, and is transmitted to the optical scanning part 151.

The light scanning part 151 scans incident light two-dimensionally, and the scanned light is directly emitted to the retina of an eyeball 210 of the wearer of the display device 1 via the lens 152 and the half mirror 153 to form a two-dimensional image. The optical scanning part 151 includes, for example, one mirror that swings with respect to two orthogonal axes. The optical scanning part 151 can be, for example, MEMS (Micro Electro Mechanical Systems) manufactured by a semiconductor process or the like. The mirror of the optical scanning part 151 can be driven by, for example, an actuator that uses a deforming force of the piezoelectric element as a driving force. Note that the projection optical system 15 may include other optical components in addition to the optical scanning part 151, the lens 152, and the half mirror 153.

The control part 23 controls a deflection angle of the light scanning part 151. For example, the control part 23 monitors inclinations in the horizontal direction and the vertical direction of the mirror of the optical scanning part 151 obtained by a horizontal displacement sensor and a vertical displacement sensor provided in the optical scanning part 151, and supplies an angle control signal to the mirror driving circuit 24. Then, based on the angle control signal from the control part 23, the mirror driving circuit 24 drives the piezoelectric element of the optical scanning part 151 and scans the mirror at a predetermined angle.

The image signal processing part 22 and the control part 23 can be configured to include, for example, a CPU (Central Processing Unit), a ROM (Read Only Memory), a RAM (Random Access Memory), a main memory, and the like. In this case, various functions of the image signal processing part 22 and the control part 23 can be realized by the CPU reading a program recorded in the ROM or the like onto the main memory to execute the program. Note that a part or the whole of the image signal processing part 22 and the control part 23 may be realized only by hardware (ASIC or the like).

[Right and Left Switching Function of Display Device]

As described above, in the display device 1, the projection optical system 15 is mounted only at one eye side. However, in the display device 1, in order to be able to be used by various users in accordance with dominant eyes, the wearable part 10 is designed to be vertically symmetric and is configured to be wearable on a head of a wearer even when the right eye side and the left eye side are inverted.

FIG. 4(a) illustrates a case in which a wearer 200 wears the wearable part 10 such that the projection optical system 15 is arranged at the left eye side, and a predetermined image (in this case, a character of "あ", for example) is visually recognized on the left eye. With respect to this state, upon the wearable part 10 being worn such that the right and left of the wearable part 10 are inverted and the projection optical system 15 is arranged at the right eye side, as illustrated in FIG. 4(b), an image obtained by inverting the predetermined image by 180 degrees is visually recognized on the right eye.

Figure 4:
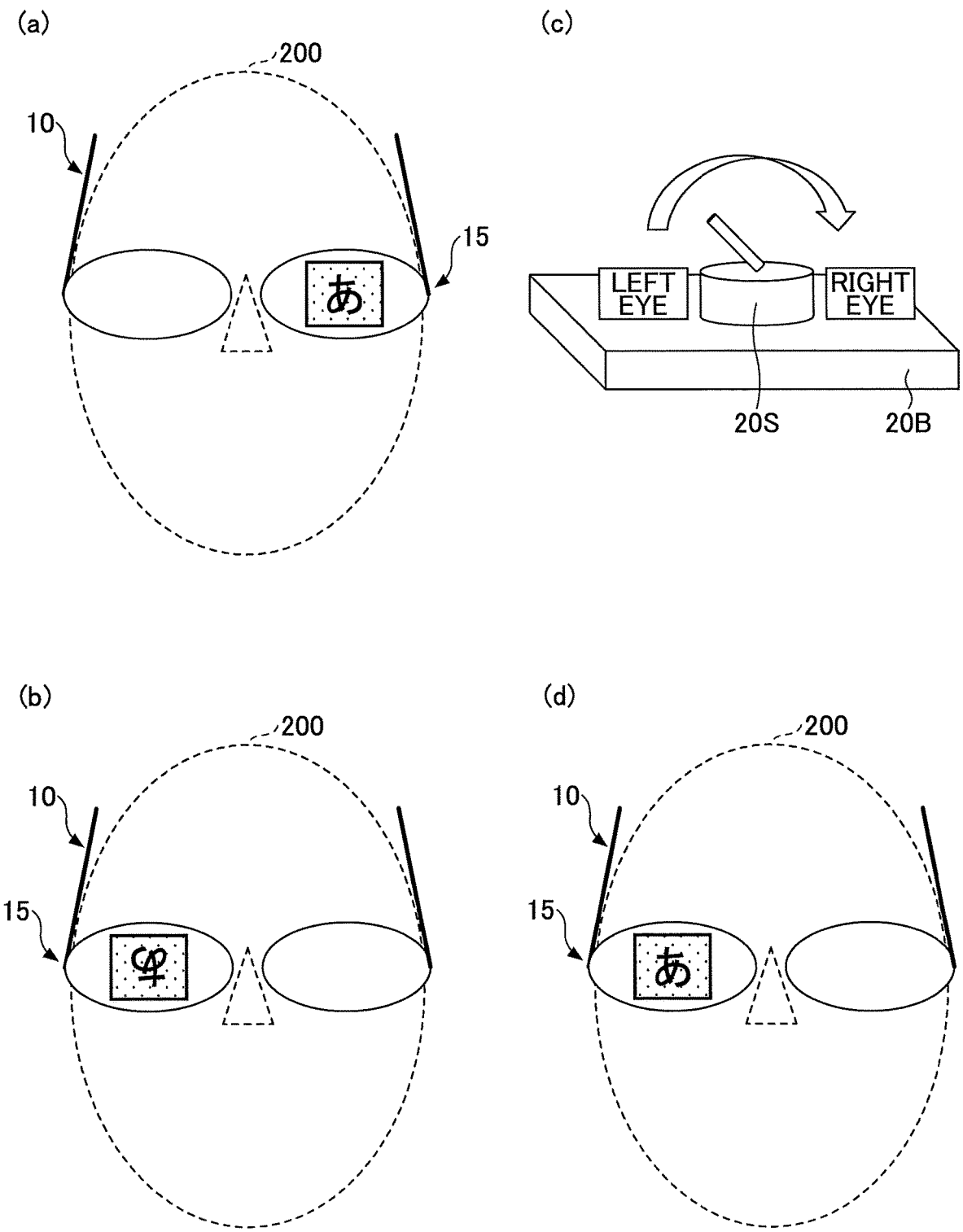
FIG. 4 is a diagram that describes inversion of the projection optical system.

Naturally, because it cannot be used in a state of FIG. 4(b), for the display device 1, a switch 20S is provided on the control box 20B as illustrated in FIG. 4(c). By switching the switch 20S to the right eye side, the image is inverted as illustrated in FIG. 4(d), and a regular image can be viewed with the right eye. Note that in the present specification, inversion of an image means that rotation of the image by 180 degrees within a plane illustrated in FIG. 4.

Here, for the display device 1, laser light is caused to obliquely enter a retina due to the characteristics of the projection optical system 15. Hence, an image projected to the retina is distorted. Thus, the display device 1 obtains a distortion rate of an image and performs distortion correction, which applies its line-symmetric distortion to an original image, to project a correct image that is not distorted.

That is, the image of "" being displayed in FIG. 4(a) is not distorted and is an image after distortion correction. If distortion correction is not performed, the undistorted original image illustrated in FIG. 5(a) is projected, as an image distorted as illustrated in FIG. 5(b), to the retina.

Figure 5:
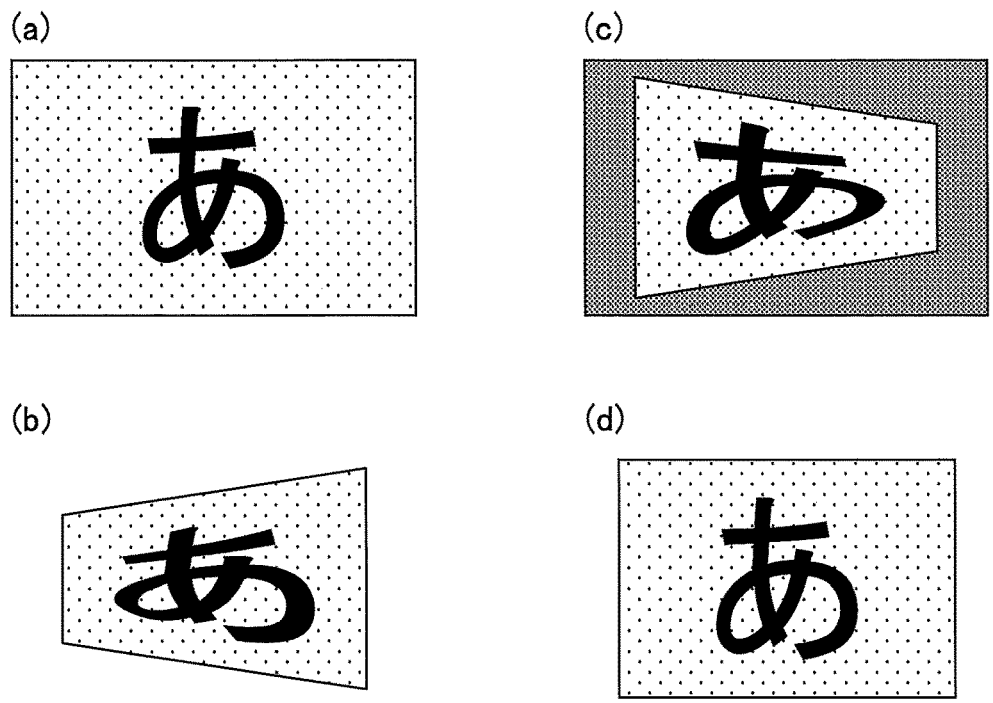
FIG. 5 is a diagram that describes an image whose distortion is corrected.

Thus, as illustrated in FIG. 5(c), the display device 1 generates an image (which is an image before scan) distorted in advance by applying distortion correction to an original image that is not distorted. Then, the respective lasers are modulated and combined in accordance with data for the image distorted in advance of FIG. 5(c), and the combined laser light is scanned by the optical scanning part 151. As a result, the distortion applied in advance by the distortion correction and the distortion caused by the laser light that obliquely enters are canceled out, and an undistorted image as illustrated in FIG. 5(d) is projected to the retina.

Figure 6:
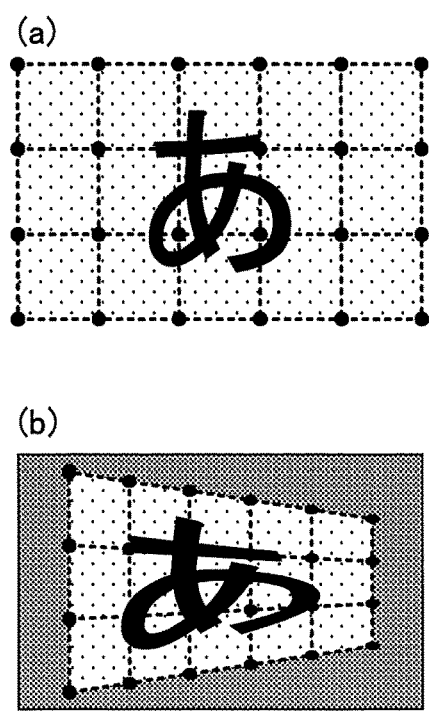
FIG. 6 is a diagram that describes a method of distortion correction.

A method of distortion correction will be briefly described with reference to FIG. 6. As illustrated in FIG. 6(a), an image before distortion correction is sectioned by using a plurality of dots. In FIG. 6(a), although 24 dots are used for the purpose of convenience, a large number of dots are used in practice.

Next, as illustrated in FIG. 6(b), the respective dot coordinates in FIG. 6(a) are moved in directions desired to be distorted. Thereby, a target image (distorted image) can be created. The amounts by which the respective dot coordinates are moved can be determined depending on an angle of laser light that enters a retina, or the like.

Note that the area indicated by the satin pattern around the dots in FIG. 6(b) is a trimmed area. Correction data is completed by making data for all the dot coordinates, moved as illustrated in FIG. 6(b), as a coordinate table. The correction data can be stored, for example, in a RAM or the like in the image signal processing part 22 (a storage unit 222 that will be described later below).

Next, inversion of image data will be described. In FIG. 4(b), the image of FIG. 4(b) is inverted, this is performed as follows. FIG. 7(a) illustrates original image data corresponding to the image of FIG. 4(b). Also, a large number of squares illustrated in FIG. 7(a) illustrate pixels that are 144 pixels in total, in this example.

In the display device 1, the control part 23 receives "ORIGINAL IMAGE DATA" from the image signal processing part 22, and as illustrated in FIG. 7(b), the control part 23 reads each pixel from "A" in the first row to "P" in the ninth row in the order illustrated in the figure, and communicates, to the light source part 21, information on which coordinates are of which color. Then, based on the information from the control part 23, the laser module 211 of the light source part 21 emits light. The laser light from the laser module 211 is scanned by the optical scanning part 151 in the order of the arrows from "A" in the first row in the same order as the "ORIGINAL IMAGE DATA" in FIG. 7(a), and a predetermined image is projected to a retina.

When the image is inverted, the control part 23 changes the order of reading image data as illustrated in FIG. 7(c) such that the pixels are not drawn from the first pixel of the image data but drawn from the last pixel. That is, as illustrated in FIG. 7(c), the control part 23 reads each pixel from "P" in the ninth row to "A" in the first row in the order illustrated in the figure. As a result, the data read by the control part 23 is arranged as illustrated in FIG. 7(d). FIG. 7(d) illustrates "INVERTED IMAGE DATA" corresponding to the image of FIG. 4(d) obtained by inverting the "ORIGINAL IMAGE DATA" of FIG. 7(a).

The control part 23 communicates, to the light source part 21, information on which coordinates are of which color based on the "INVERTED IMAGE DATA". Then, based on the information from the control part 23, the laser module 211 of the light source part 21 emits light. The laser light from the laser module 211 is scanned by the optical scanning part 151, as illustrated in FIG. 7(d), in the order of the arrows from "P" in the ninth row, and the image of FIG. 4(d), obtained by inverting the image of FIG. 4(b) corresponding to FIG. 7(a), is projected to the retina.

Although distortion correction is not considered in the above description, distortion correction is performed in practice in addition to inversion of the image. That is, as described above, in the display device 1, as illustrated in FIG. 5(c), the respective lasers are modulated and combined in accordance with data for an image distorted in advance, and the combined laser light is scanned by the optical scanning part 151. That is, image data after distortion correction corresponding to the image of FIG. 5(c) is "ORIGINAL IMAGE DATA".

Figure 8:
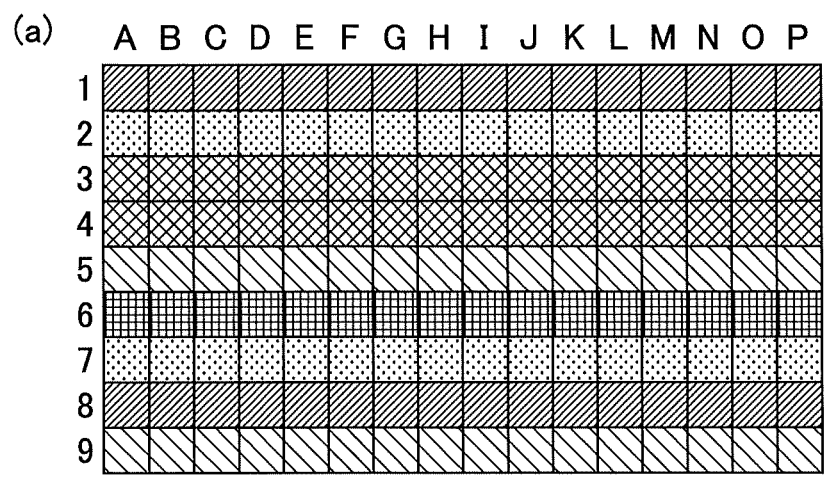
FIG. 8 is a diagram that describes inversion of image data after distortion correction (part 1).
Figure 8:
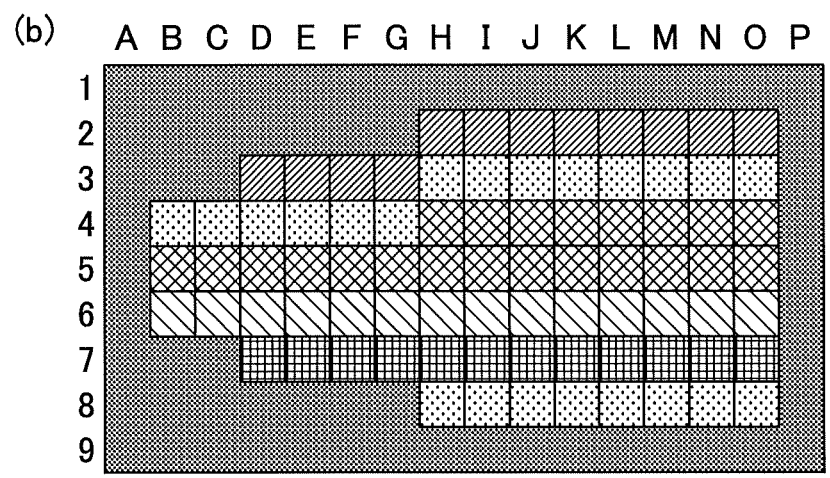
Figure 8:
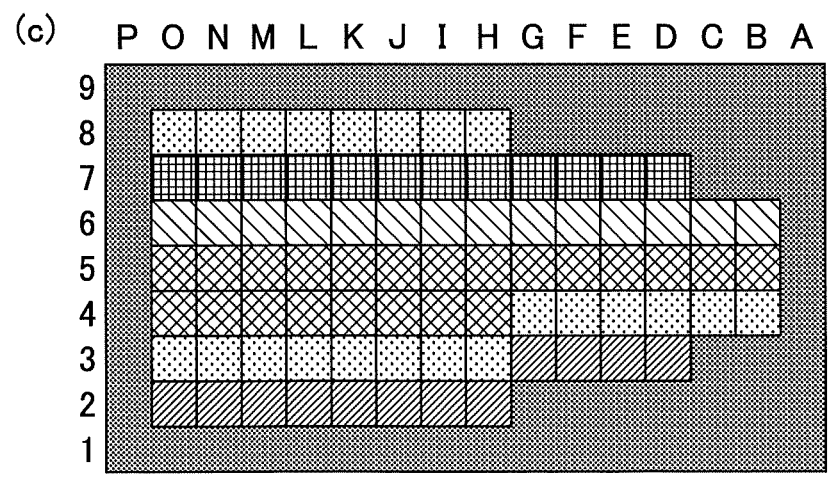
Figure 9:
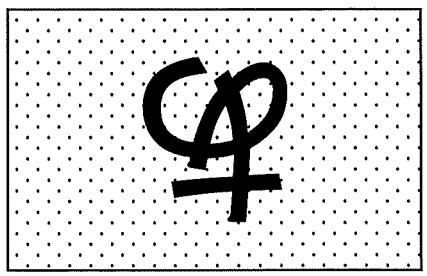
FIG. 9 is a diagram that describes inversion of image data after distortion correction (part 2).
Figure 9:
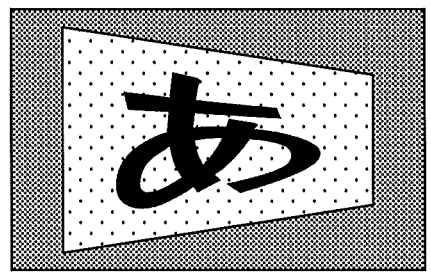
Figure 9:
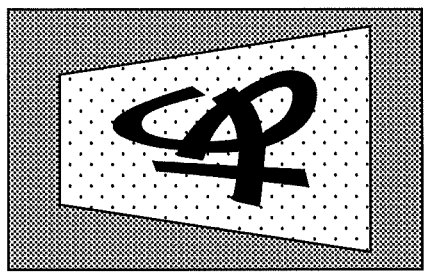
Figure 9:
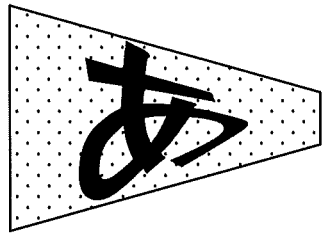

This will be described with reference to FIG. 8 and FIG. 9. Here, FIG. 8(a) illustrates original image data in a case where the image of FIG. 9(a) is viewed (in a state of FIG. 4(b)). Further, FIG. 8(b) illustrates data, obtained by applying distortion correction for left eyes to the data of FIG. 8(a), and corresponds to the image of FIG. 9(b) (image before scan).

Figure 7:
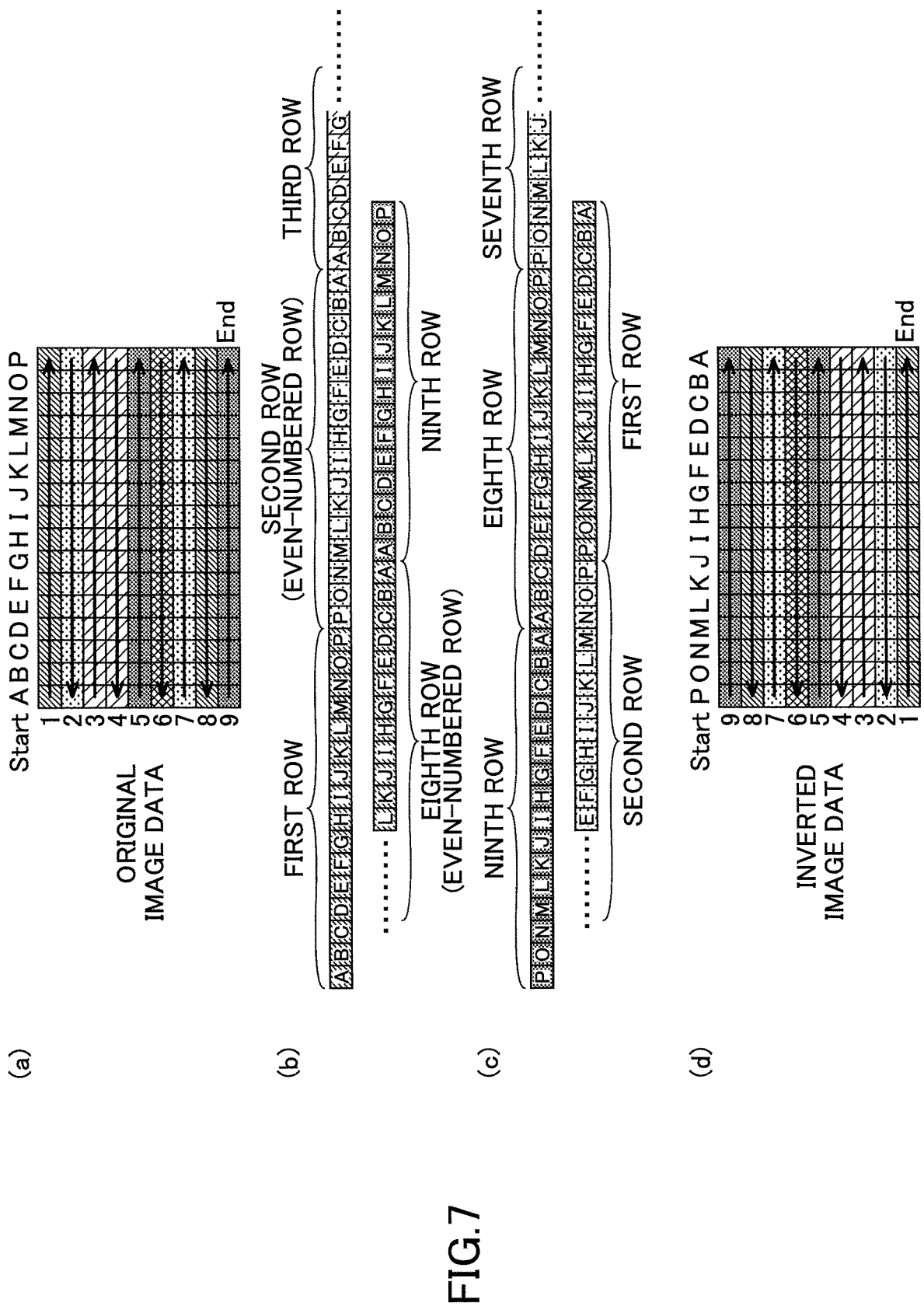
FIG. 7 is a diagram that describes inversion of image data before distortion correction.

Upon inverting the data of FIG. 8(b) in the procedure of FIG. 7, data as illustrated in FIG. 8(c) is obtained, and the data of FIG. 8(c) corresponds to the image of FIG. 9(c) (image before scan) obtained by inverting the image of FIG. 9(b). Upon scanning laser light corresponding to the data of FIG. 8(c) to project the image to a retina, a distortion, which is caused by obliquely incident laser light, is added to the image of FIG. 9(c) (image before scan), and an image further distorted as illustrated in FIG. 9(d) is projected to the retina.

As described above, when the left and right of the wearable part 10 are inverted, an undistorted image is not projected to a retina by simply inverting image data without considering for which eye distortion correction should be performed, and an image further distorted is projected to the retina. Thus, in the display device 1, inversion of an image is performed in a procedure described in the following. This will be described with reference to FIG. 4 and FIG. 10 to FIG. 12. Note that in FIG. 10, a switch signal flows as indicated by the thin arrows and image data flows as indicated by the thick arrows.

A case will be discussed in which the wearer 200 wears the wearable part 10 such that the projection optical system 15 is arranged at the left eye side as illustrated in FIG. 4(a), and then the wearer 200 wears again the wearable part 10 such that the projection optical system 15 is arranged at the right eye side as illustrated in FIG. 4(b). At this time, image data of FIG. 12(a) is input to the image signal processing part 22, and an image of FIG. 11(a) is viewed (a state of FIG. 4(b)).

Figure 10:
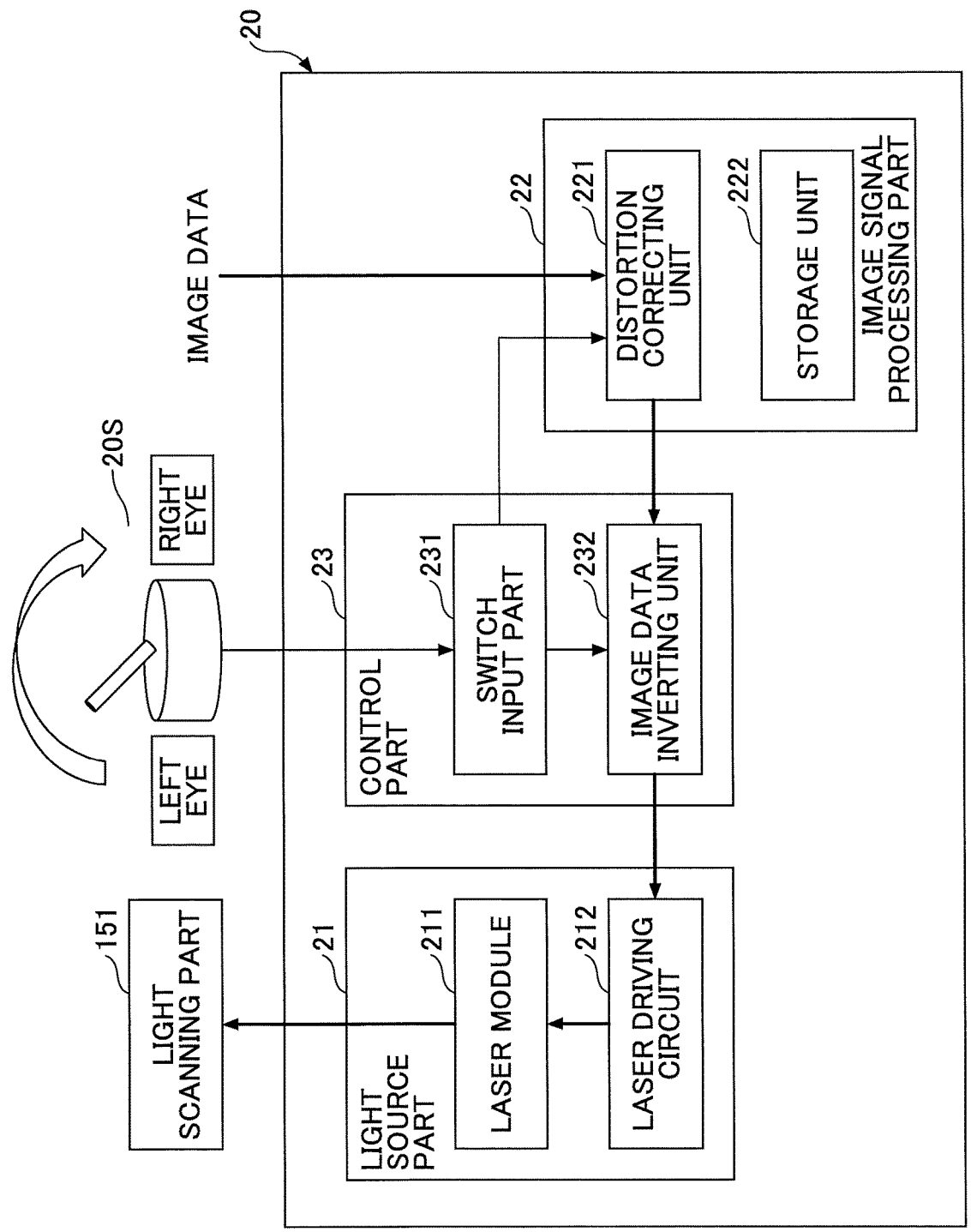
FIG. 10 is a diagram that describes preferable distortion correction and inversion of image data (part 1).

Here, upon the wearer 200 switching the switch 20S from the left eye side to the right eye side as illustrated in FIG. 10, the switch 20S generates a switching signal (for example, a H or L signal) representing that the side at which the projection optical system 15 is arranged has been switched and inputs the signal to the switch input part 231 of the control part 23. The switch input part 231 recognizes, based on the switching signal, that the switch 20S has been switched to the right side. Then, the switch input part 231 communicates the recognized information to the distortion correcting unit 221 of the image signal processing part 22 (a portion that corrects the distortion of the image) and the image inverting unit 232 of the control part 23 (a portion that inverts the image).

Note that the storage unit 222 stores correction data for correcting a distortion of an image when the image is projected to a left eye (correction data for left eyes) and correction data for correcting a distortion of an image when the image is projected to a right eye (correction data for right eyes).

Subsequently, the distortion correcting unit 221 reads, from the storage unit 222, the correction data for right eyes among the correction data for right eyes and the correction data for left eyes. Then, the distortion correcting unit 221 performs, according to the method described with reference to FIG. 6, distortion correction on input image data of FIG. 12(*a*) (data before distortion correction). Thereby, image data of FIG. 12(*b*) (data after distortion correction for right eyes) corresponding to the image illustrated in FIG. 11(*b*) (image before scan) is generated.

Next, the image inverting unit 232 inverts, according to the method described with reference to FIG. 6, the image data of FIG. 12(*b*) to generate the data of FIG. 12(*c*). That is, the data of FIG. 12(*c*) is inverted data obtained by applying, to the original data, distortion correction for right eyes. The image corresponding to the data of FIG. 12(*c*) (image before scan) is as illustrated in FIG. 11(*c*).

Figure 11:
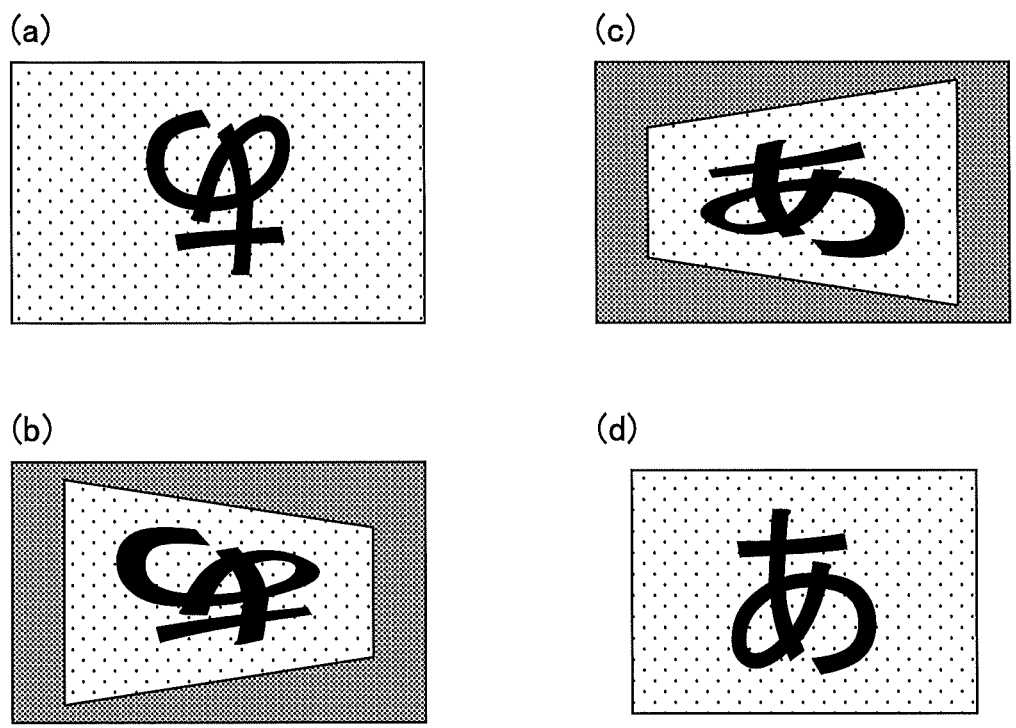
FIG. 11 is a diagram that describes preferable distortion correction and inversion of image data (part 2).
Figure 12:
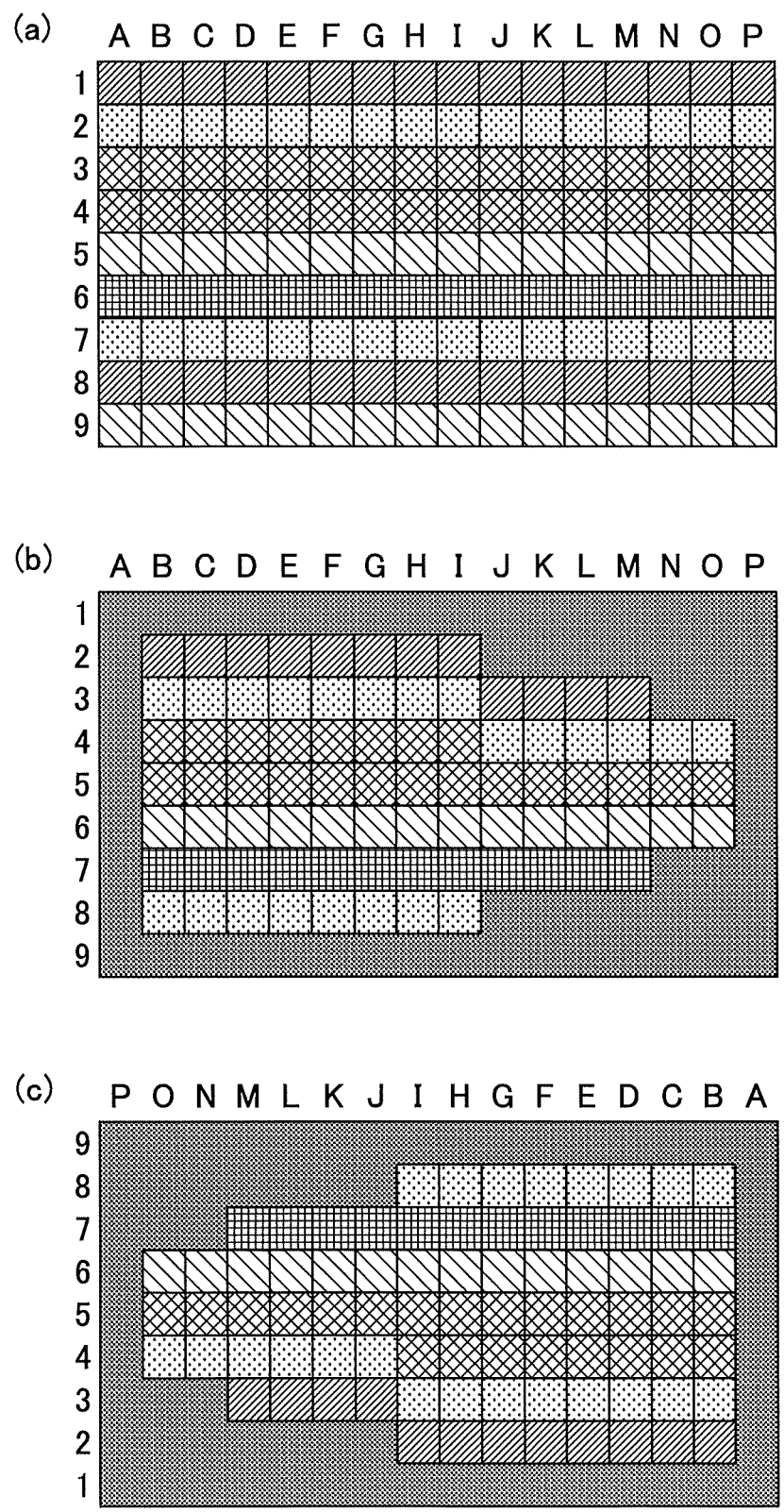
FIG. 12 is a diagram that describes preferable distortion correction and inversion of image data (part 3).

Upon the optical scanning part 151 scanning the data of FIG. 12(*c*), the distortion applied in advance by the distortion correction and the distortion caused by laser light that obliquely enters are canceled out, and an undistorted image as illustrated in FIG. 11(*d*) is projected to the retina of the right eye. This corresponds to the state of FIG. 4(*d*).

Note that although the image inverting unit 232 inverts image data after the distortion correcting unit 221 performs distortion correction in the above description, this order may be opposite. In practice, distortion correction and inversion of image data are performed almost simultaneously.

As described above, although the projection optical system 15 is mounted at only one eye side, the wearable part 10 is designed to be vertically symmetric and inverted to be used for both a right eye and a left eye such that the display device 1 according to the present embodiment is used by various users in accordance with dominant eyes.

Then, when the wearable part 10 is reattached from one eye side to the other eye side (when the eye to which an image is projected by the projection optical system 15 is switched from the one eye to the other eye), the wearer 200 switches the switch 20S. A switching signal, which represents that switching from the one eye side to the other eye side, is generated at the switch 20S by an operation of switching the switch 20S by the wearer 200, and is communicated to the distortion correcting unit 221 and the image inverting unit 232. Then, based on the switching signal, the distortion correcting unit 221 performs distortion correction, by switching from correction data corresponding to the one eye to correction data corresponding to the other eye, and the image inverting unit 232 performs image inversion.

Thereby, a normal image without distortion can be displayed on a retina, by a simple method of operating the switch 20S, irrespective of which eye side the wearable part 10 is worn on.

Although a preferable embodiment has been described above in details, the present invention is not limited to the embodiment described above, and various modifications and changes may be made embodiments with respect to the above described embodiment without departing from the scope defined in the claims.

For example, the embodiment described above has a configuration in which, when the wearable part 10 is reattached from one eye side to the other eye side, the wear 200 switches the switch 20S. However, an embodiment may have a configuration in which a sensor that generates a switching signal that represents that the side at which the projection optical system 15 is arranged has been switched is provided such that the distortion correcting unit 221 performs distortion correction and the image inverting unit 232 performs image inversion based on the switching signal. As the sensor in this case, for example, an acceleration sensor or the like can be used.

Further, although the wearable part has a glasses shape in the embodiment described above, the wearable part is not necessarily required to have a glasses shape. For example, a wearable part, in which a projection optical system is built, may have a shape to be wearable on and removable from general glasses that a wearer wears on a head. In this case, by configuring it to be wearable on and removable from both the right eye side and the left eye side of the glasses, it can be used by various users in accordance with dominant eyes.

When the wearable part is configured to be wearable on and removable from both the right eye side and the left eye side of the glasses, a terminal for connection determination may be provided in advance such that a case in which the wearable part is worn on the right eye side and a case in which the wearable part is worn on the left eye side are automatically detected based on a state of the terminal for connection determination to switch selection of correction data at the time of distortion correction and setting of image inversion. For example, a switch may be used as the terminal for connection determination, and the switch may be configured to be off when the wearable part is attached to one eye side, and to be on when the wearable part is attached to the other eye side. This corresponds to a configuration that provides the switch at the wearable part side instead of providing it at the control box side.

The present international application is based on and claims the benefit of priority of Japanese Patent Application No. 2015-198033 filed on Oct. 5, 2015, and the entire contents of Japanese Patent Application No. 2015-198033 are incorporated herein by reference.

DESCRIPTION OF THE REFERENCE NUMERALS

1: display device
10: wearable part
10*f*: front
10*t*: temple
15: projection optical system
20: circuit part
20B: control box
20S: switch
21: light source part
22: image signal processing part
23: control part
24: mirror driving circuit
28: power source part
29: battery
30: cable 151: optical scanning part
152: lens
153: half mirror
210: eyeball
211: laser module
212: laser driving circuit
221: distortion correcting unit
222: storage unit
231: switch input part
232: image inverting unit

The invention claimed is:

1. A retinal scan display device comprising:
a projector configured to obliquely project, by laser light, an image to a retina of an eye;
a processor configured to correct a distortion of the image and configured to invert the image;
a wearable part shaped as a pair of glasses; and
a memory configured to store first correction data for correcting the distortion of the image when the image is projected to a left eye and second correction data for correcting the distortion of the image when the image is projected to a right eye,
wherein the processor generates the first correction data and the second correction data based on an angle at which the laser light is projected from the projector to the retina,
wherein, based on a switching signal that represents that a side at which the projector is arranged has been switched from one eye side to the other eye side, the processor performs distortion correction, by switching from correction data corresponding to one eye to correction data corresponding to the other eye, and the processor performs image inversion,
wherein the projector is provided on either one eye side or the other eye side of the wearable part, and
wherein the wearable part has symmetry in a vertical direction so that the one eye side and the other eye side of the wearable part are respectively wearable on a right eye side and a left eye side of a user and so that the one eye side and the other eye side of the wearable part are respectively wearable on the left eye side and the right eye side of the user.

2. The display device according to claim 1, wherein the switching signal is generated by an operation of switching a switch by the user.

3. The display device according to claim 1, wherein the switching signal is generated by a sensor that detects that the side at which the projector is arranged has been switched from the one eye side to the other eye side.

4. The display device according to claim 1, wherein the first correction data and the second correction data indicate dot coordinates when sectioning an original image, which is not distorted, into a plurality of dots and moving the plurality of dots in accordance with the angle.

5. A retinal scan display device comprising:
a projector configured to project an image to a retina of an eye;
a processor configured to correct a distortion of the image and configured to invert the image; and
a memory configured to store correction data for correcting the distortion of the image when the image is projected to a left eye and correction data for correcting the distortion of the image when the image is projected to a right eye,
wherein, based on a switching signal that represents that a side at which the projector is arranged has been switched from one eye side to the other eye side, the processor performs distortion correction, by switching from correction data corresponding to one eye to correction data corresponding to the other eye, and the processor perfoinis image inversion,
wherein the retinal scan display device includes a wearable part shaped as a pair of glasses,
wherein the projector is provided on either one eye side or the other eye side of the wearable part, and
wherein the wearable part has symmetry in a vertical direction so that the one eye side and the other eye side of the wearable part are respectively wearable on a right eye side and a left eye side of a user and so that the one eye side and the other eye side of the wearable part are respectively wearable on the left eye side and the right eye side of the user.

* * * * *